(12) United States Patent
Pittman et al.

(10) Patent No.: US 10,419,076 B2
(45) Date of Patent: *Sep. 17, 2019

(54) HARVEST TAG DESIGN AND SYSTEM

(71) Applicants: VIETAGZ LLC, Sarasota, FL (US);
IZIPLINE, LLC, Sarasota, FL (US)

(72) Inventors: William T. Pittman, Sarasota, FL (US);
Michelle Moulin, Sarasota, FL (US);
Keoki Trask, Lakewood Ranch, FL (US)

(73) Assignees: VIETAGZ LLC, Sarasota, FL (US);
IZIPLINE, LLC, Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/140,865

(22) Filed: Sep. 25, 2018

(65) Prior Publication Data

US 2019/0028147 A1 Jan. 24, 2019

Related U.S. Application Data

(63) Continuation of application No. 15/402,190, filed on Jan. 9, 2017, now Pat. No. 10,116,354.

(60) Provisional application No. 62/276,585, filed on Jan. 8, 2016.

(51) Int. Cl.
*H04B 5/00* (2006.01)

(52) U.S. Cl.
CPC ......... *H04B 5/0037* (2013.01); *H04B 5/0062* (2013.01); *Y02D 70/00* (2018.01); *Y02D 70/164* (2018.01); *Y02D 70/166* (2018.01)

(58) Field of Classification Search
CPC .... H04B 5/0037; H04B 5/0031; H04B 10/11; H04B 10/114; H04B 10/1141; H04B 10/1143; H04B 10/116; H04B 10/50; H04B 10/516; H04B 10/5162; H04B 10/541; H04B 10/60; H04B 10/615; H04B 10/616; H04B 10/66; H04B 10/697; H04B 17/23
USPC ....................................... 455/41.1
See application file for complete search history.

(56) References Cited

U.S. PATENT DOCUMENTS

| 2013/0271265 A1* | 10/2013 | Finn | H01Q 1/2225 340/10.1 |
| 2014/0285416 A1* | 9/2014 | Priyantha | H04B 5/0037 345/156 |
| 2015/0076909 A1* | 3/2015 | Biederman | G02B 27/017 307/44 |
| 2017/0093463 A1* | 3/2017 | Wang | H04B 5/0037 |

* cited by examiner

*Primary Examiner* — Ajibola A Akinyemi
(74) *Attorney, Agent, or Firm* — Jeffrey B. Fabian; Shumaker, Loop & Kendrick, LLP (57) ABSTRACT

The instant invention is directed to a tuned inductive coil that is designed to work within the field of a separate NFC (Near Field Communication) tag for the purpose of harvesting ambient energy that is transmitted during the bi-directional signal process in order to effect unique functionality which requires higher energy consumption and which would not otherwise be possible or as effective absent such harvest of energy such as, but not limited to operation of a light, a sound or a tactile transducer or similar circuitry, separate of the function of the nearby NFC tag.

13 Claims, 12 Drawing Sheets

HARVEST TAG DESIGN AND SYSTEM

CROSS REFERENCE TO RELATED APPLICATIONS

This application is a continuation of U.S. application Ser. No. 15/402,190 filed on Jan. 9, 2017. U.S. application Ser. No. 15/402,190 itself claims priority to U.S. Provisional Application No. 62/276,858 filed on Jan. 8, 2016. All of the above applications are incorporated herein in their entirety by reference along with PCT Application No. WO 2015/147946.

TECHNICAL FIELD AND BACKGROUND

The instant invention is directed to a tuned inductive coil that is designed to work within the field of a separate NFC (Near Field Communication) tag for the purpose of harvesting ambient energy that is transmitted during the bi-directional signal process in order to effect unique functionality which requires higher energy consumption and which would not otherwise be possible or as effective absent such harvest of energy such as, but not limited to operation of a light, a sound or a tactile transducer or similar circuitry, separate of the function of the nearby NFC tag.

The use of NFC technology for remotely bridging connections between users and machines or machine and machine is known. For example, retail shops, transportation terminals, industrial factories and other areas of large user congregation such as colleges and outdoor events all use contactless, NFC-enabled POS ("Point of Sale") terminals, ticketing terminals, access control points or objects embedded with NFC technology to process payments or exchange open or secure data. However, it is appreciated that the randomness of Nearfield Communication connections leaves the end user disengaged with the point of interaction and that restrictions on mobile device hardware and/or software limits the engagement notification capabilities of the engagement operators.

In addition to the above, the use of inductive coil arrangements for the purpose of remotely powering electronic hardware and circuitry such as a light, a buzzer, a microphone, camera or a tactile motor is also known.

"Passive" or non-powered inductive coils for use with mobile devices have operated either with the purpose of data transfer or low-power transmission. For example, in the retail purchase environment, the use of a portable electronic device ("PED") to communicate a secure payment request and payment processing gateway. Whereas in consumer electronics products, PED charging systems need only have a PED placed on or near them (not connected via a wired connection) in order to benefit from the use of an inductive coil for the purposes of a slow, but effective recharging of the PED's battery. Stated differently, prior design configurations utilize inductive coil designs for use in NFC communication protocols for data exchange or similar design configurations to recharge PED batteries or power other devices or circuits.

Given the above, an inductive coil designed to achieve designed functionality or to enable enhanced functionality within the field of a standard NFC tag (hereafter referred to as "NFC tag") would be desirable.

SUMMARY

A specialized, non-NFC, paired, inductive coil design is provided. The non-NFC inductive coil (hereafter referred to as "Harvesting Tag") can operate independently and without the presence of the nearby NFC tag, yet harvests more ambient energy when operated within the field of the nearby NFC tag during a traditional NFC engagement with a PED (hereafter referred to as "NFC engagement"). In this manner, the use of an inductive power transference coil that has been optimally tuned to operate within certain magnetic induction radiated field specifications (including but not limited to 13.56 MHz as used by the NFC protocol), can be used within the presence of an NFC tag and result in enhanced power collection for devices connected to the Harvesting Tag.

BRIEF DESCRIPTION OF THE DRAWINGS

Features, aspects, and advantages of the present invention are better understood when the following detailed description of the invention is read with reference to the accompanying drawings, in which.

DETAILED DESCRIPTION

The present invention will now be described more fully hereinafter with reference to the accompanying figures in which exemplary embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use, and practice the invention.

Relative terms such as lower or bottom; upper or top; upward, outward, or downward; forward or backward; and vertical or horizontal may be used herein to describe one element's relationship to another element illustrated in the figures. It will be understood that relative terms are intended to encompass different orientations in addition to the orientation depicted in the drawings. By way of example, if a component in the drawings is turned over, elements described as being on the "bottom" of the other elements would then be oriented on "top" of the other elements. Relative terminology, such as "substantially" or "about," describe the specified materials, steps, parameters, or ranges as well as those that do not materially affect the basic and novel characteristics of the claimed inventions as whole (as would be appreciated by one of ordinary skill in the art).

As previously stated, the invention includes a specialized, non-NFC, paired, inductive coil design. The non-NFC inductive coil (hereafter referred to as "Harvesting Tag") can operate independently and without the presence of the nearby NFC tag, yet harvests more ambient energy when operated within the field of the nearby NFC tag during a traditional NFC engagement with a PED (hereafter referred to as "NFC engagement"). In this manor, the use of an inductive power transference coil that has been optimally tuned to operate within certain magnetic induction radiated field specifications (including but not limited to 13.56 MHz as used by the NFC protocol), can be used within the presence of an NFC tag and result in enhanced power collection for devices connected to the Harvesting Tag.

Dedicated hardware and/or software circuitry can be connected to the Harvesting Tag, which may be designed to utilize all or part of the collected energy for the powering of the attached circuitry. This circuitry may include but is not limited to a speaker, a buzzer, a vibratory transducer, a light or lighted material, an electroluminescent panel, an electroluminescent wire or an electroluminescent coating which is colored or lighted differently during NFC engagement when the Harvesting Tag is placed within the presence of an NFC tag as opposed to when it is isolated from the operating vicinity of the inductive field of an NFC tag. Similarly, such a transducer could be used to signal the completion of an NFC engagement transaction, so as to notify the user that a connection has been properly initiated or completed.

Figure 1:
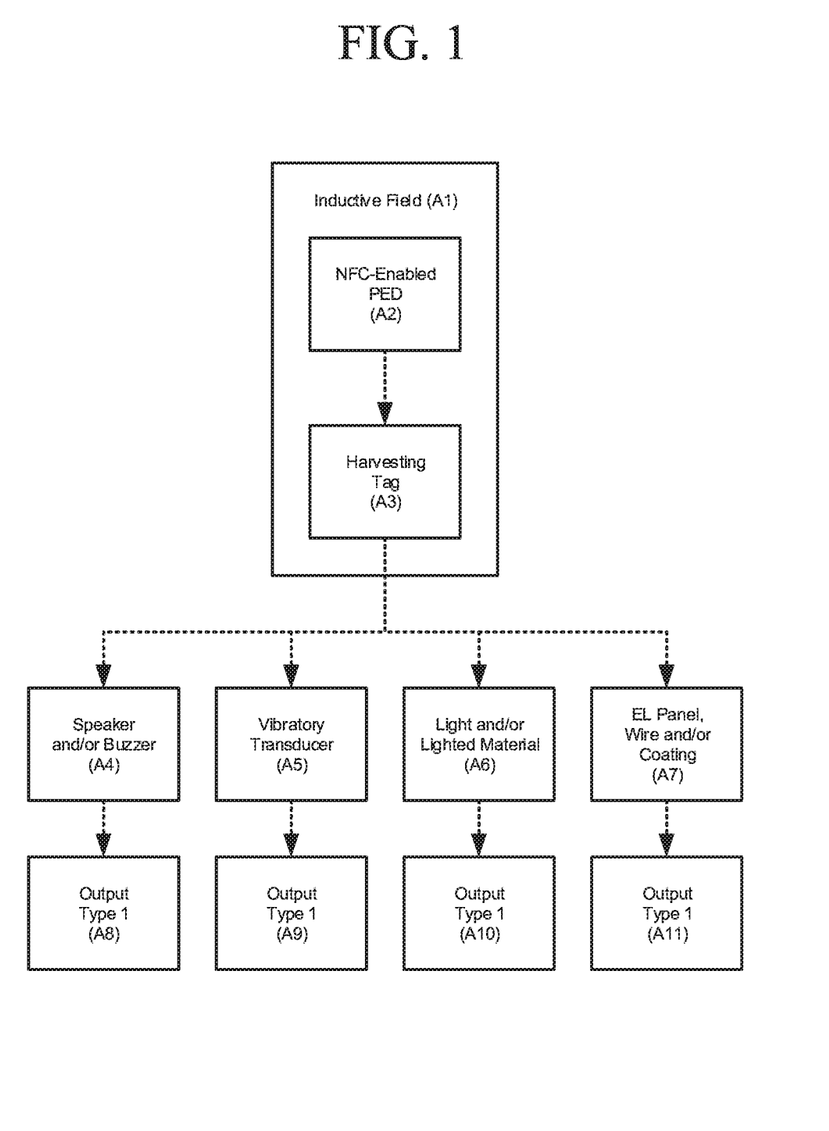
FIG. 1 is a schematic of a first embodiment of the invention.
Figure 2:
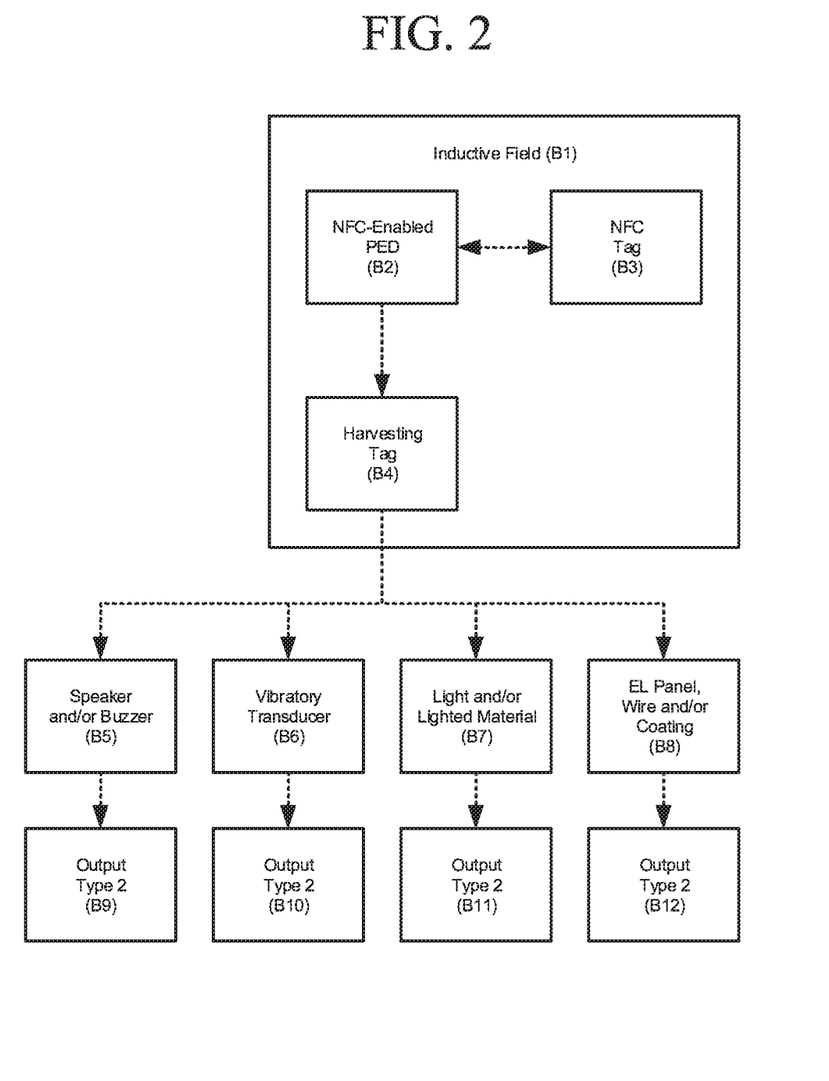
FIG. 2 is a schematic of a second embodiment of the invention.

Referring now to FIGS. 1 and 2, Harvesting Tags A3, B4 are shown transferring energy from A2, B2, during the inductive process while NFC-enabled PEDs A2, B2 are within an inductive field with NFC Tag B3 and Harvesting Tag A3 or B4 to one or many local hardware devices (A4-A7) outputting a first type (Type 1) of content that corresponds with each hardware device and device B5-B8 such as a sound device B5, vibratory transducer B6, light B7 and/or electroluminescent panel B8 (for examples) and outputting a second type (Type 2) of content that corresponds with each hardware device.

Other, more power demanding hardware and/or software circuitry can be added in order to record local environmental or transactional data within the vicinity of the NFC engagement. This circuitry may include localized hardware and/or software sensors and the electrical components required to operate such sensors. These sensor circuits may include but are not limited in scope to a camera, a microphone, a thermal sensor, a barometric sensor, an accelerometer, a GPS ("Global Positioning Satellite") receiver and the like. Data recorded by and/or on such devices may be stored on the sensor hardware circuitry, at a secondary local storage device, at a secondary remote storage device, on the user's mobile device and/or transmitted via the user's mobile device to a remote storage device such as a web-based hard-drive, "cloud-based network" or similar storage device.

Figure 3:
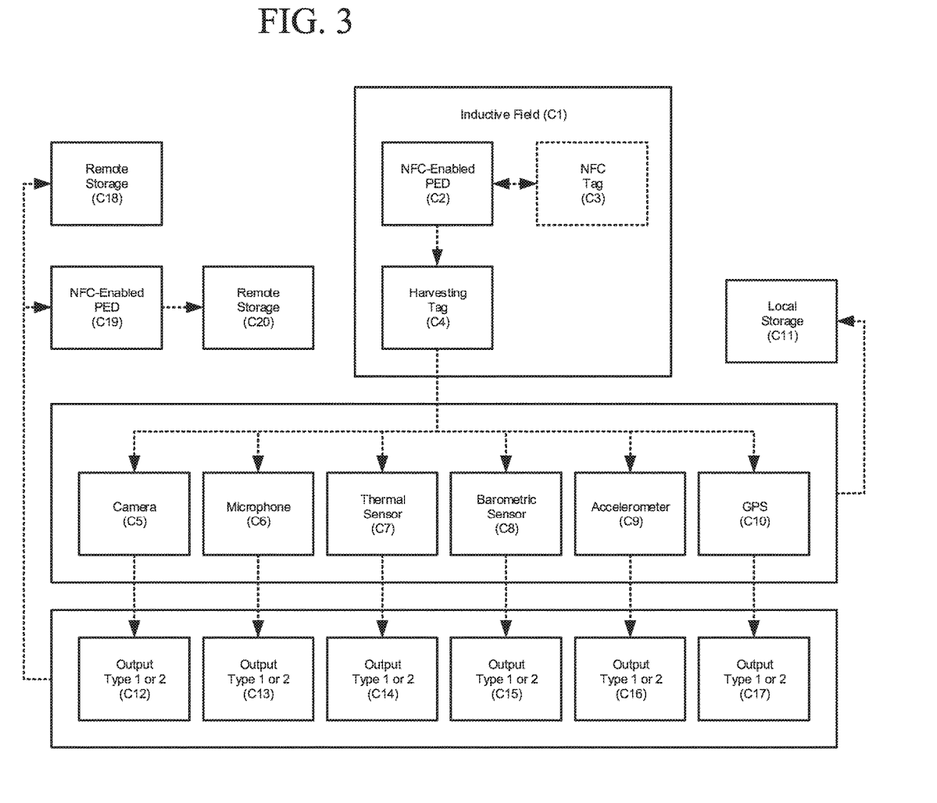
FIG. 3 is a schematic of a third embodiment of the invention.

FIG. 3 is a schematic diagram of the Harvesting Tag transferring energy to one or many local hardware devices with or without the presence of an NFC tag and outputting either Type 1 content or Type 2 content depending upon the presence of the NFC tag. FIG. 3 also shows the Type 1 or Type 2 content being saved to a local storage device or to a remote storage device.

Figure 4:
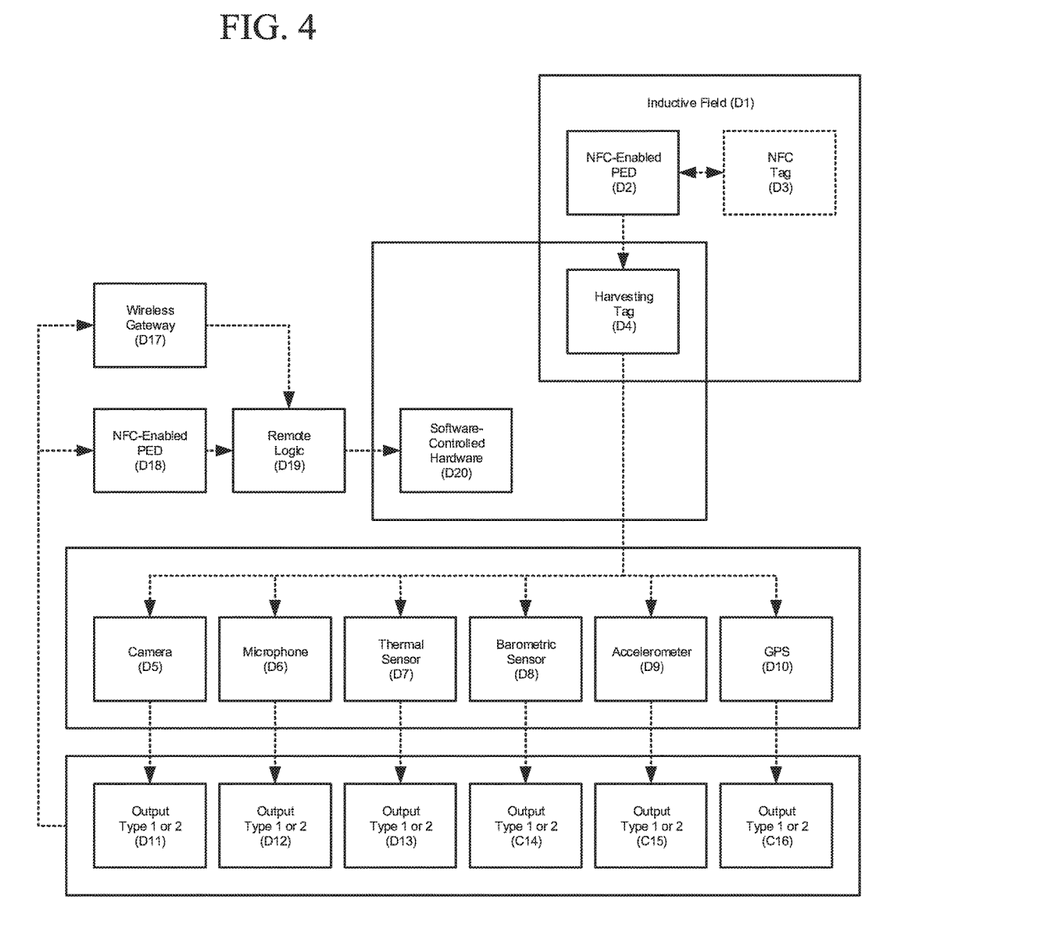
FIG. 4 is a schematic of a fourth embodiment of the invention.

FIG. 4 shows the Harvesting Tag transferring energy to one or many local hardware devices with or without the presence of an NFC tag and outputting either Type 1 content or Type 2 content depending upon the presence of the NFC tag. FIG. 4 also shows the Type 1 or Type 2 content being transmitted to a remote logic application for analysis and interpretation resulting in a decision that is then transmitted to software-controlled hardware that is localized to the Harvesting Tag.

Additional hardware and/or software can be added to the design and deployment of the Harvesting Tag so as to provide local and/or remote interactivity with the hardware and/or software that is physically attached to the Harvesting Tag. Such systems could include local and/or remote current provision and/or logic circuits which allow for the local Harvesting Tag circuitry and/or remote intelligence (such as $3^{rd}$-party analytics software operated via a service provider) to respond to human and/or machine interaction based on certain pre-determined security and/or campaign-driven directives. With such capabilities, it would be possible to provide photo proof-of-interaction during NFC engagement while simultaneously providing said capabilities within a battery-less package.

Figure 5:
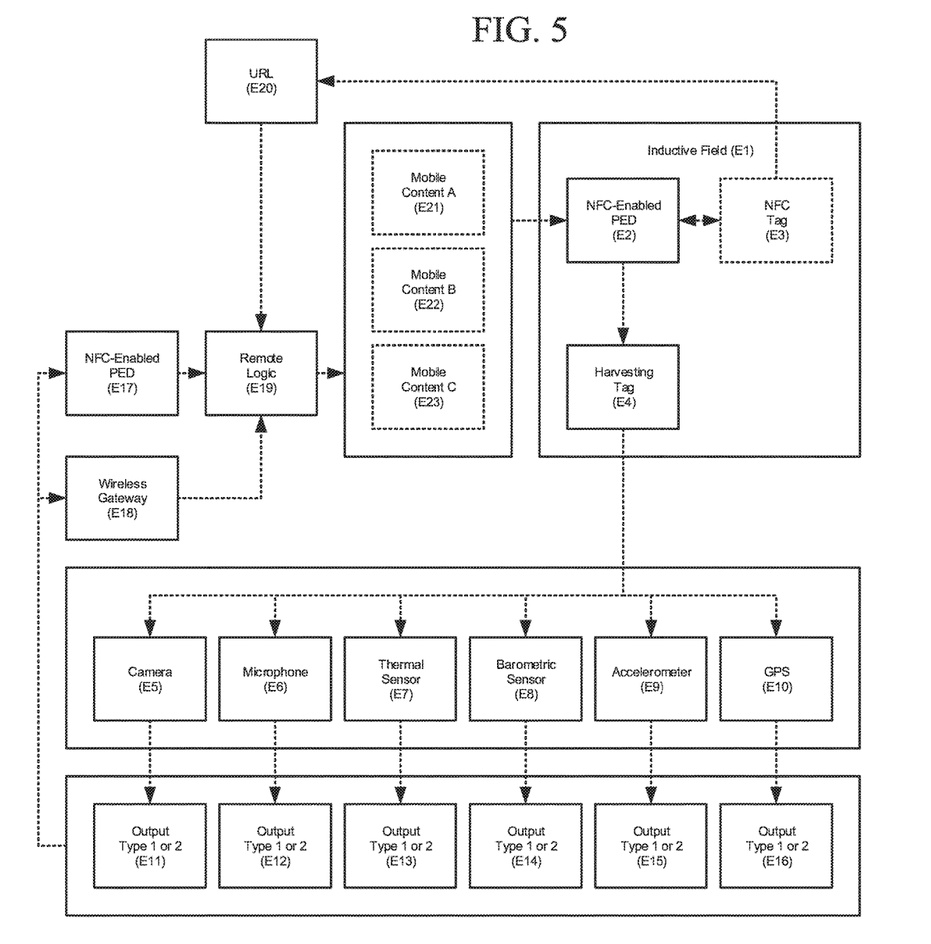
FIG. 5 is a schematic of a fifth embodiment of the invention.

FIG. 5 is a schematic diagram of the Harvesting Tag transferring energy to one or many local hardware devices with or without the presence of an NFC tag and outputting either Type 1 content or Type 2 content depending upon the presence of the NFC tag. FIG. 5 also shows the Type 1 or Type 2 content being transmitted to a remote logic application for analysis and interpretation resulting in a decision that selects the content that the NFC tag URL will redirect to.

And further-still, these hardware and software systems can be connected to the delivery or non-delivery of data that is facilitated by the design of the nearby, yet physically disconnected NFC tag. As NFC tags are often used to transmit and initiate a web URL for secure or non-secure information and/or files, such systems could be used to measure, record and/or authenticate certain environmental parameters during NFC engagement for proper routing of the NFC tag's content. With such capabilities, it would be possible to enable various bio-metric purposes such as but not limited to cloud-based facial recognition authorization services during NFC engagements that would require authentication prior to the delivery of the desired content and/or prior to releasing physical locks within the environment of the NFC engagement while simultaneously providing said capabilities within a battery-less package.

Figure 6:
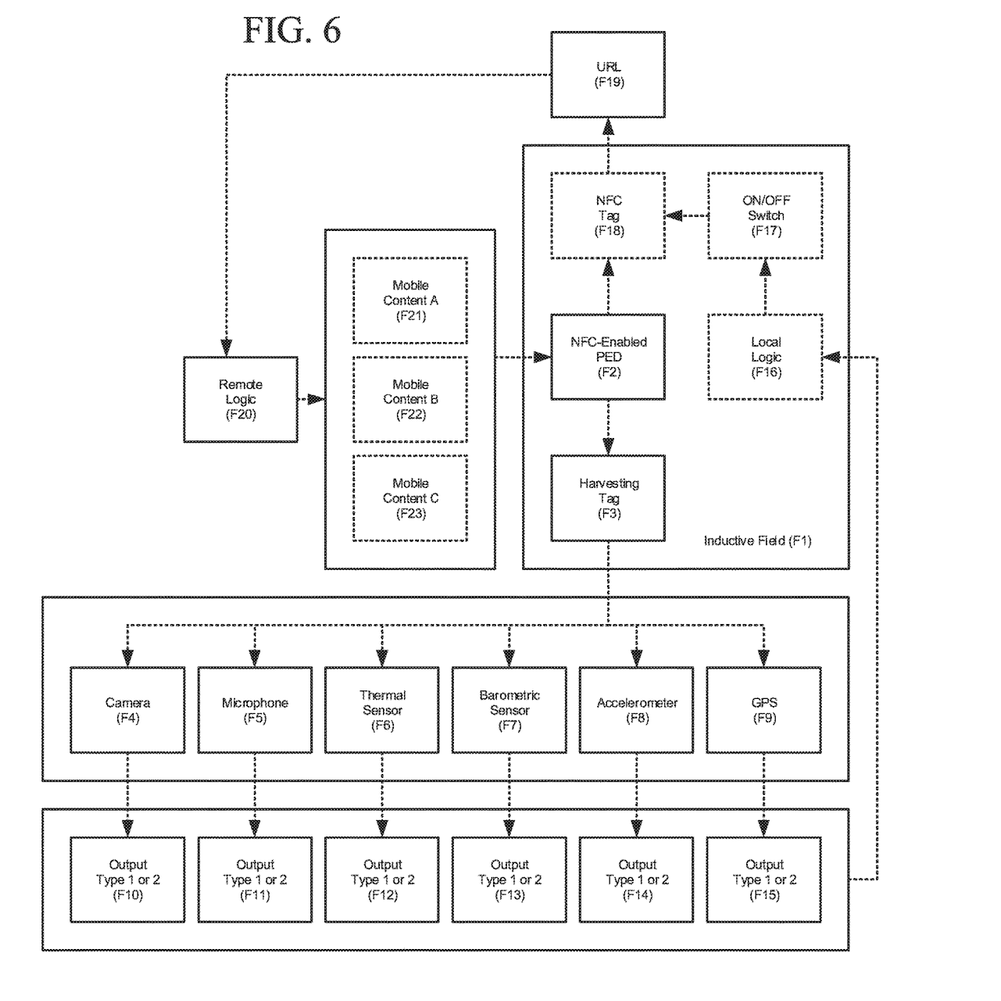
FIG. 6 is a schematic of a sixth embodiment of the invention.

FIG. 6 is a schematic drawing of the Harvesting Tag transferring energy to one or many local hardware devices with or without the presence of an NFC tag and outputting either Type 1 content or Type 2 content depending upon the presence of the NFC tag. FIG. 6 also shows the Type 1 or Type 2 content being transmitted to a local logic application that either allows or disallows the functional operation of the NFC tag. In addition, FIG. 6 also shows an optional remote logic application that can select the content that the NFC tag URL will redirect to.

Figure 7:
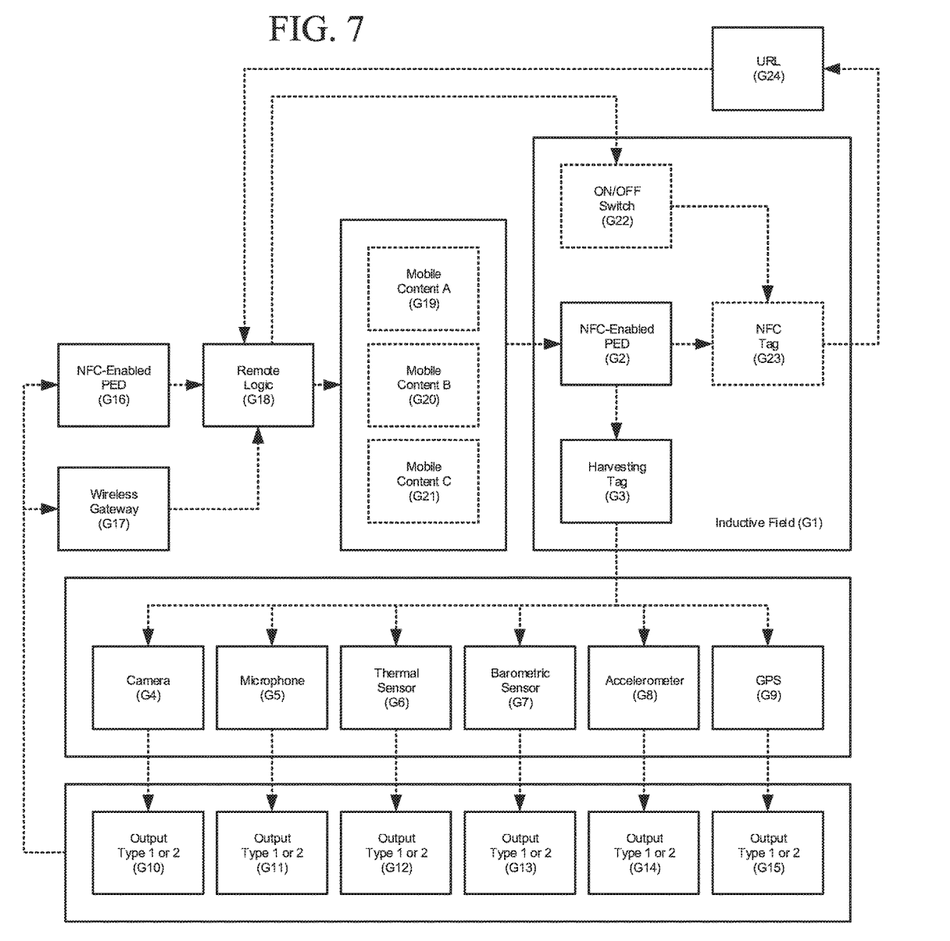
FIG. 7 is a schematic of a seventh embodiment of the invention.

FIG. 7 is a schematic drawing of the Harvesting Tag transferring energy to one or many local hardware devices with or without the presence of an NFC tag and outputting either Type 1 content or Type 2 content depending upon the presence of the NFC tag. FIG. 7 also shows the Type 1 or Type 2 content being transmitted to a remote logic application which, upon analysis, either allows or disallows the functional operation of the NFC tag and can determine the content received by the optional NFC tag engagement initiator (PED).

And further-still, such inter-connected logic capabilities, both local and remote, would make possible local and/or remote termination of the NFC tag experience itself and result in an added layer of security and/or a clearer operational use state for the end user. With such capabilities, it would also be possible to toggle nearby electronic components based on the resulting local hardware output. For example, turning on powered lights if a camera sensor comes back too dark.

Figure 8:
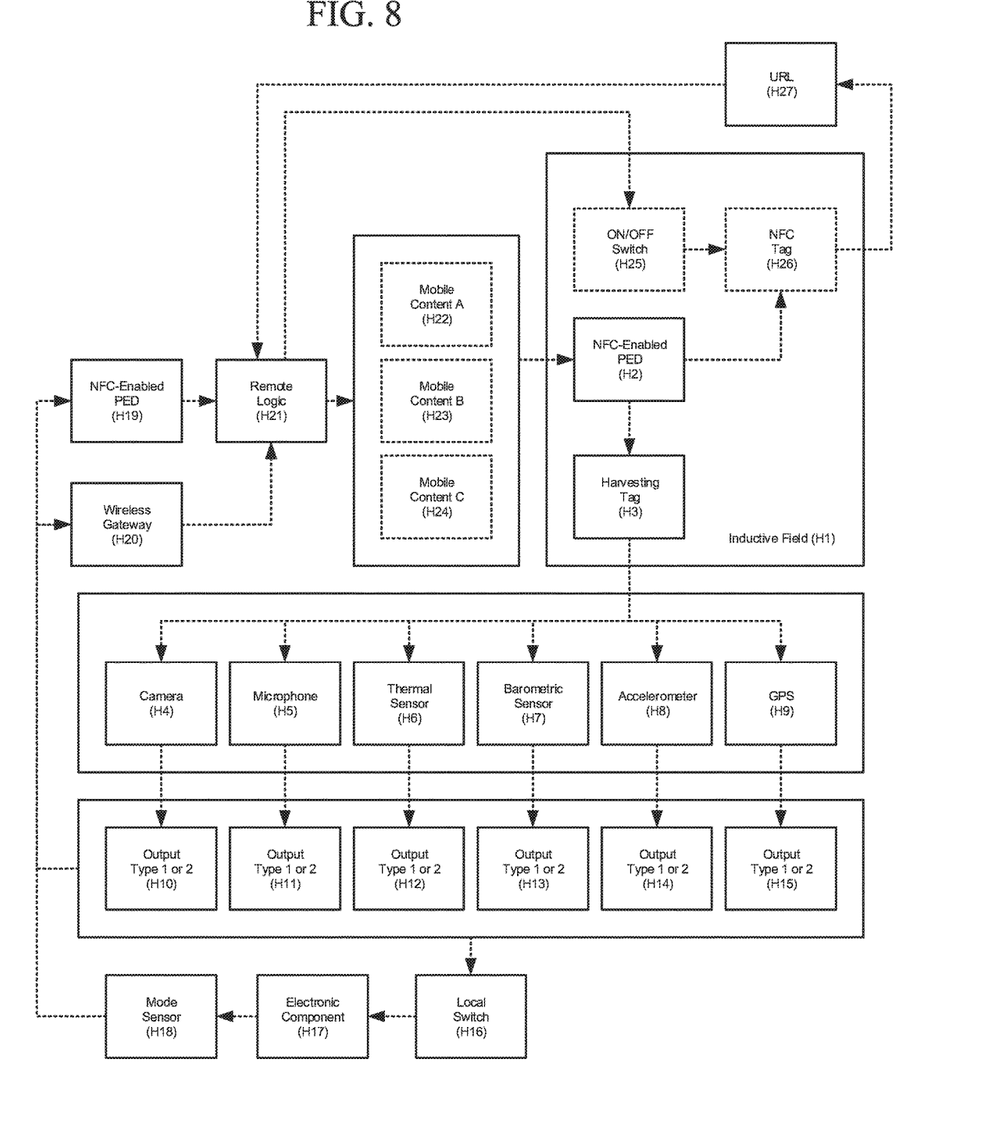
FIG. 8 is a schematic of an eighth embodiment of the invention.

FIG. 8 is a schematic drawing of the Harvesting Tag transferring energy to one or many local hardware devices with or without the presence of an NFC tag and outputting either Type 1 content or Type 2 content depending upon the presence of the NFC tag. Figure H also shows the Type 1 or Type 2 content toggling a local switch which in turn controls a local electronic component. The state of this local electronic component can be monitored by a local sensor whose data, along with the local hardware output data, is transmitted to a remote logic application which, upon analysis, either allows or disallows the functional operation of the NFC tag and can determine the content received by the optional NFC tag engagement initiator (PED).

And further-still, these hardware and software systems can be connected to the delivery or non-delivery of data that is facilitated by the design of the nearby, yet physically disconnected NFC ag. As NFC tags are often used to transmit and initiate a web URL for secure or non-secure information and/or files, such systems could be used to measure, record and/or authenticate certain environmental parameters during NFC engagement for proper routing of the NFC tag's content. With such capabilities, it would be possible to provide cloud-based facial recognition authorization services during NFC engagements that would require authentication prior to the delivery of the desired content while simultaneously providing said capabilities within a battery-less package. With such capabilities, it would also be possible to locally or remotely terminate the NFC tag experience itself and result in an added layer of security or a clearer operational use state for the end user. With such capabilities, it would also be possible to toggle nearby electronic components based on the resulting local hardware output. For example, turning on powered lights if a camera sensor comes back too dark.

Figure 9:
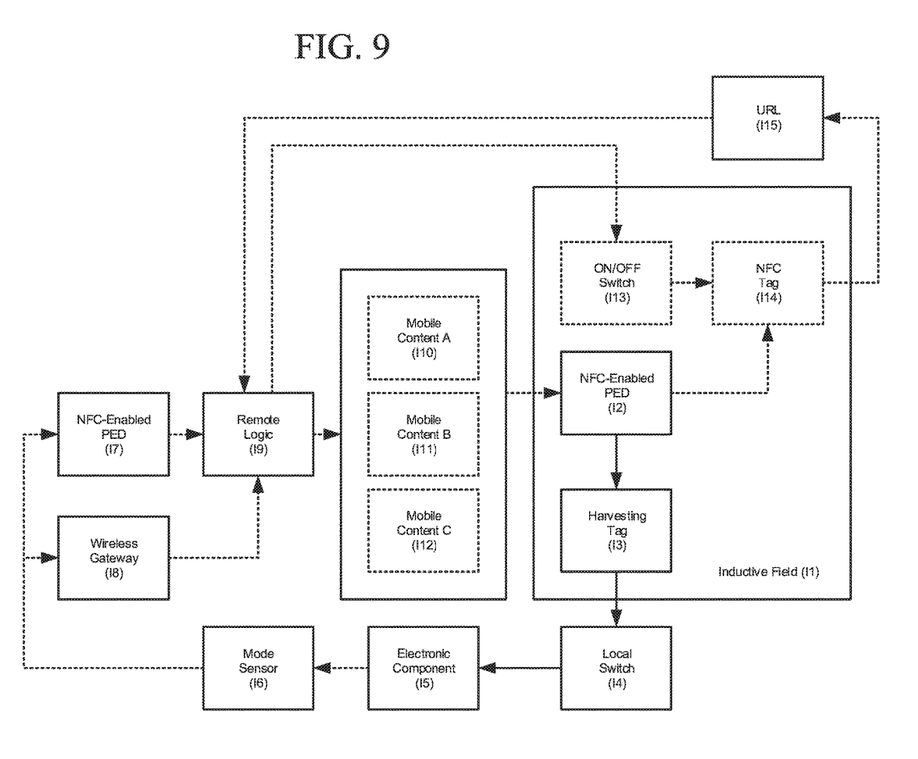
FIG. 9 is a schematic of a ninth embodiment of the invention.

FIG. 9 is a schematic drawing of the Harvesting Tag transferring energy to one or many local switches which in turn controls a local electronic component with or without the presence of an NFC tag and resulting in either Type 1 function or Type 2 function from the local electronic component depending upon the presence of the NFC tag. The state of this local electronic component can be monitored by a local sensor whose data is transmitted to a remote logic application which, upon analysis, either allows or disallows the functional operation of the NFC tag and can determine the content received by the optional NFC tag engagement initiator (PED).

Figure 10:
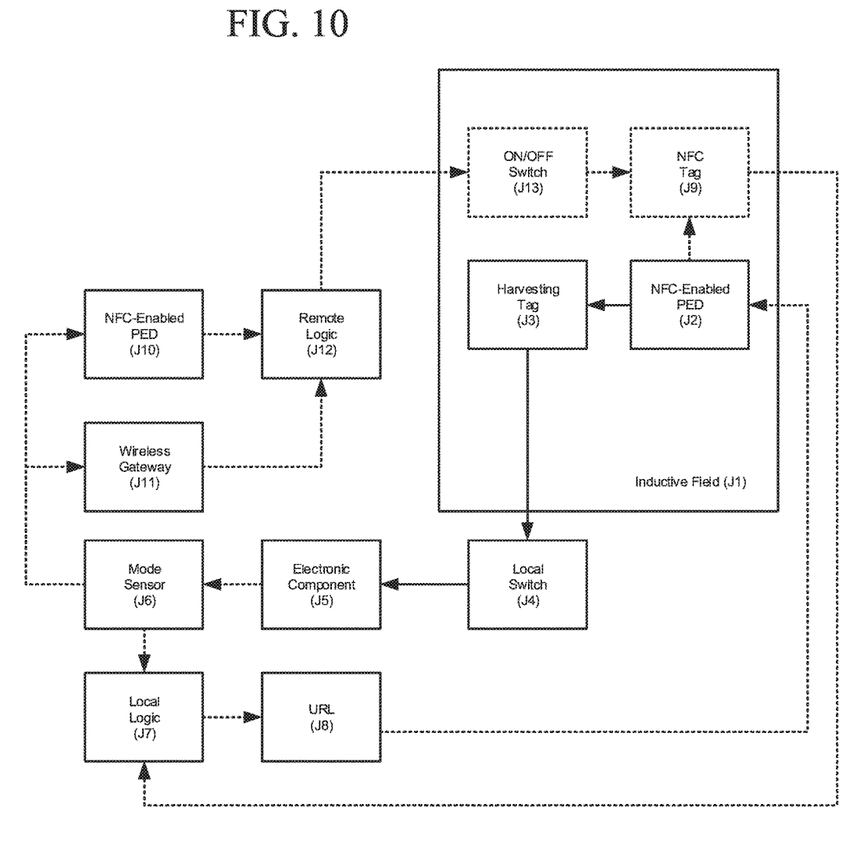
FIG. 10 is a schematic of a tenth embodiment of the invention.

Turning now to FIG. 10 which shows the Harvesting Tag transferring energy to one or many local switches which in turn control a local electronic component with or without the presence of an NFC tag and resulting in either Type 1 function or Type 2 function from the local electronic component depending upon the presence of the NFC tag. The state of this local electronic component can be monitored by a local sensor whose data is transmitted to a remote logic application which, upon analysis, either allows or disallows the functional operation of the NFC tag or may also transmit electronic component mode data to a local logic application which can determine the content that will be received by the optional NFC tag engagement initiator (PED).

Figure 11:
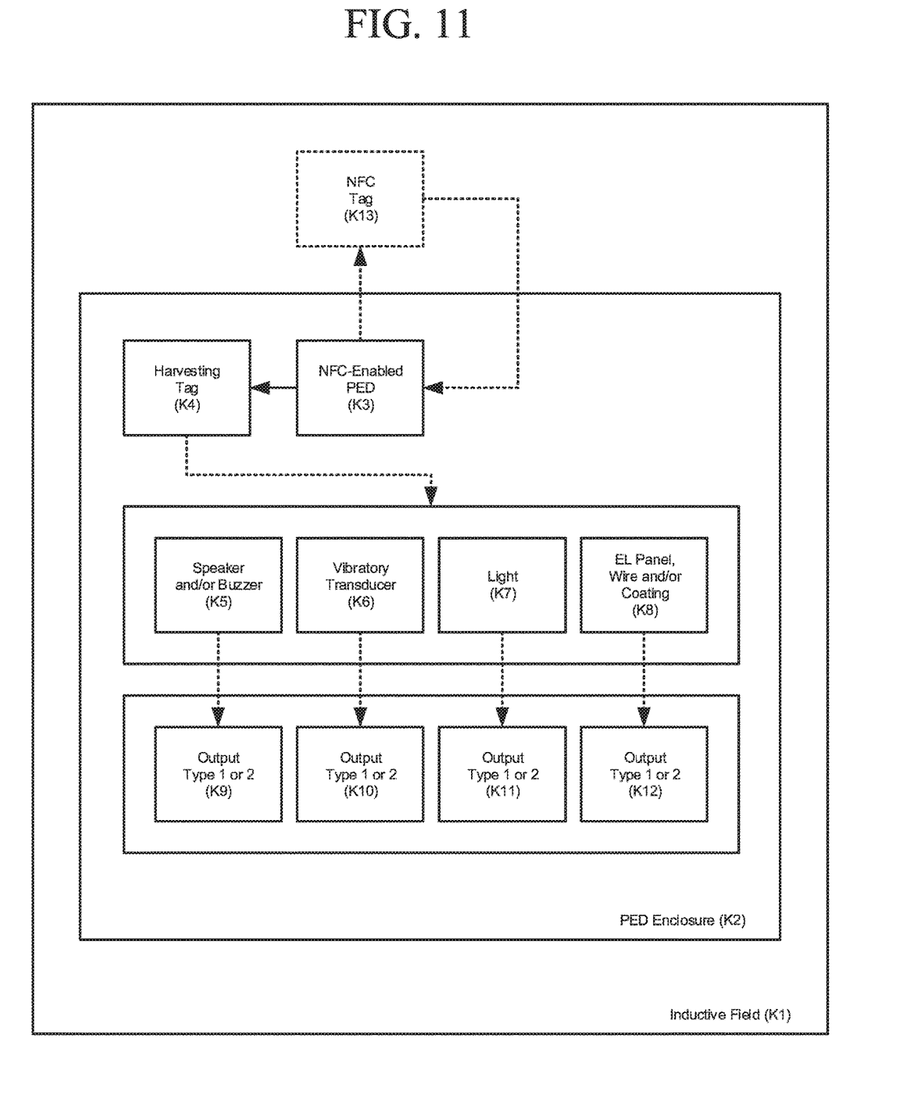
FIG. 11 is a schematic of an eleventh embodiment of the invention.

With regard to FIG. 11, the Harvesting Tag transfers energy from the NFC-enabled PED to one or many local hardware devices with or without the presence of an NFC tag and resulting in either Type 1 content or Type 2 content delivered on the PED from the local hardware devices depending upon the presence of the NFC tag during the inductive process.

Figure 12:
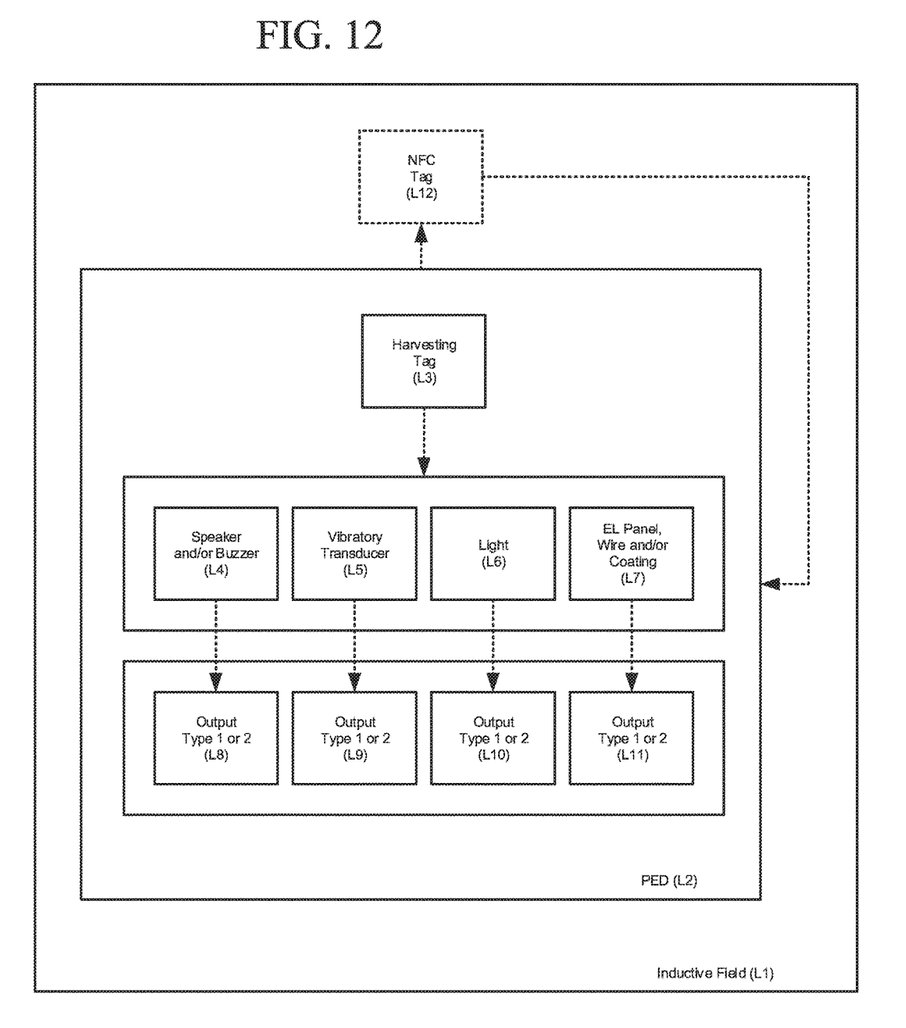
FIG. 12 is a schematic of a twelfth embodiment of the invention.

Lastly, FIG. 12 is a schematic drawing of the Harvesting Tag transferring energy from the NFC-enabled PED during the inductive process to one or many local hardware devices with or without the presence of an NFC tag and resulting in either Type 1 content or Type 2 content delivered through the PED from the local hardware devices depending upon the presence of the NFC tag during the inductive process.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

What is claimed is:

1. An energy harvesting system comprising:
   (a) a harvesting tag comprising an antenna tuned for both solo performance and performance proximal to at least one NFC tag and tuned to operate within an electromagnetic field;
   (b) a secondary hardware module adapted to receive an energy signal from the harvesting tag and generate an output, wherein
      (i) the harvesting tag is in a non-operative first state when the harvesting tag is not within the electromagnetic field,
      (ii) the harvesting tag is in an operative second state and the output is a first content type when the harvesting tag is within the electromagnetic field but the harvesting tag is not proximal to the at least one NFC tag,
      (iii) the harvesting tag is in an operative third state and the output is a second content type when the harvesting tag is within the electromagnetic field and the harvesting tag is proximal to the at least one NFC tag; and wherein
      (iv) the secondary hardware module comprises a luminescent material and the first content type is light emitted in a first pattern and the second content type is light emitted in a second pattern.

2. The system of claim 1, further comprising a tertiary hardware module adapted to receive an energy signal from the harvesting tag and generate an output, wherein the tertiary hardware module is selected from the group consisting of speakers, buzzers, vibratory transducers, lights, lighting panels, electroluminescent panels, cameras, microphones, thermal sensors, barometric sensors, accelerometers, GPS devices or combinations thereof.

3. The system of claim 1, wherein the antenna comprises an inductive coil and the electromagnetic field is a first inductive field generated by a NFC-enabled portable electronic device.

4. The system of claim 3 further comprising (a) a secondary portable electronic device having a remote logic application that is configured to receive the output and generate a decision, and (b) software-controlled hardware that is local to the harvesting tag that is configured to receive the decision.

5. The system of claim 4 further comprising a tertiary hardware module adapted to receive an energy signal from the harvesting tag and generate an output, wherein (a) the tertiary hardware module is a camera configured to capture a digital image of a user, and the output is the digital image; and
(b) the remote logic application is configured to analyze the digital image to verify an identity of the user, and the decision is a first type when the user can be identified and a second type when the user cannot be identified.

6. The system of claim 1 further comprising: (a) a secondary portable electronic device configured to receive the output; and (b) a storage device configured to save the output.

7. The system of claim 1 further comprising an NFC-tag control application coupled to the at least one NFC tag, wherein the NFC-tag control application is configured to perform the operations of (a) receiving the output, and (b) enabling or disabling the at least one NFC tag from generating an inductive field based on the output.

8. The system of claim 1 further comprising:
(a) a local switch coupled to an electronic component and configured to receive the output;
(b) a mode sensor coupled to the electronic component and configured to monitor the state of the electronic component and generate a component status; and
(c) a secondary portable electronic device having a remote logic application, wherein the remote logic application is configured to perform the operations of:
(i) receiving the output and the component status, and
(ii) enabling or disabling the at least one NFC tag from generating an inductive field based on the output and the component status.

9. The system of claim 1 further comprising:
(a) a local switch coupled to an electronic component and configured to receive the output;
(b) a mode sensor coupled to the electronic component and configured to monitor the state of the electronic component and generate a component status; and
(c) a secondary portable electronic device having a remote logic application, wherein the remote logic application is configured to perform the operations of:
(i) receiving the output and the component status, and
(ii) enabling or disabling the electronic component based on the output and the component status.

10. The system of claim 1 further comprising a tertiary hardware module adapted to receive an energy signal from the harvesting tag and generate an output, wherein the tertiary hardware module comprises an audio speaker and the first content type is sound emitted in a first pattern and the second content type is sound emitted in a second pattern.

11. The system of claim 1 further comprises a tertiary hardware module adapted to receive an energy signal from the harvesting tag and generate an output, wherein the tertiary hardware module comprises a vibratory transducers and the first content type is vibration of a first pattern and the second content type is vibration of a second pattern.

12. An energy harvesting system comprising:
(a) a harvesting tag comprising an antenna tuned for both solo performance and performance proximal to at least one NFC tag and tuned to operate within a first inductive field generated by a NFC-enabled portable electronic device;
(b) a local switch coupled to an electronic component and configured to receive an energy signal from the harvesting tag, wherein
(i) the harvesting tag is in a non-operative first state when the harvesting tag is not within the first inductive field,
(ii) the harvesting tag is in an operative second state and the energy signal is a first type when the harvesting tag is within the first inductive field but the harvesting tag is not proximal to the at least one NFC tag, and
(iii) the harvesting tag is in an operative third state and the energy signal is a second type when the harvesting tag is within the first inductive field and the harvesting tag is proximal to the at least one NFC tag;
(c) a secondary hardware module adapted to receive an energy signal from the harvesting tag and generate an output, wherein the secondary hardware module comprises a luminescent material and the first content type is light emitted in a first pattern and the second content type is light emitted in a second pattern;
(d) a mode sensor coupled to the electronic component and configured to monitor the state of the electronic component and generate a component status; and
(e) a secondary portable electronic device having a remote logic application, wherein the remote logic application is configured to perform the operations of:
(i) receiving the component status, and
(ii) enabling or disabling the at least one NFC tag from generating a second inductive field based on the component status.

13. An energy harvesting system comprising:
(a) a NFC-enabled portable electronic device that generates an inductive field;
(b) a harvesting tag comprising an antenna tuned for both solo performance and performance proximal to at least one NFC tag and tuned to operate within the inductive field;
(c) a secondary hardware module adapted to receive an energy signal from the harvesting tag and generate an output, wherein
(i) the harvesting tag is in a non-operative first state when the harvesting tag is not within the inductive field,
(ii) the harvesting tag is in an operative second state and the output is a first content type when the harvesting tag is within the inductive field but the harvesting tag is not proximal to the at least one NFC tag,
(iii) the harvesting tag is in an operative third state and the output is a second content type when the harvesting tag is within the inductive field and the harvesting tag is proximal to the at least one NFC tag, and wherein
(iv) the secondary hardware module comprises a luminescent material and the first content type is light emitted in a first pattern and the second content type is light emitted in a second pattern.

* * * * *